Sept. 28, 1965   W. C. VIRBILA   3,209,363
INDICATING APPARATUS
Filed Sept. 1, 1961   5 Sheets-Sheet 1

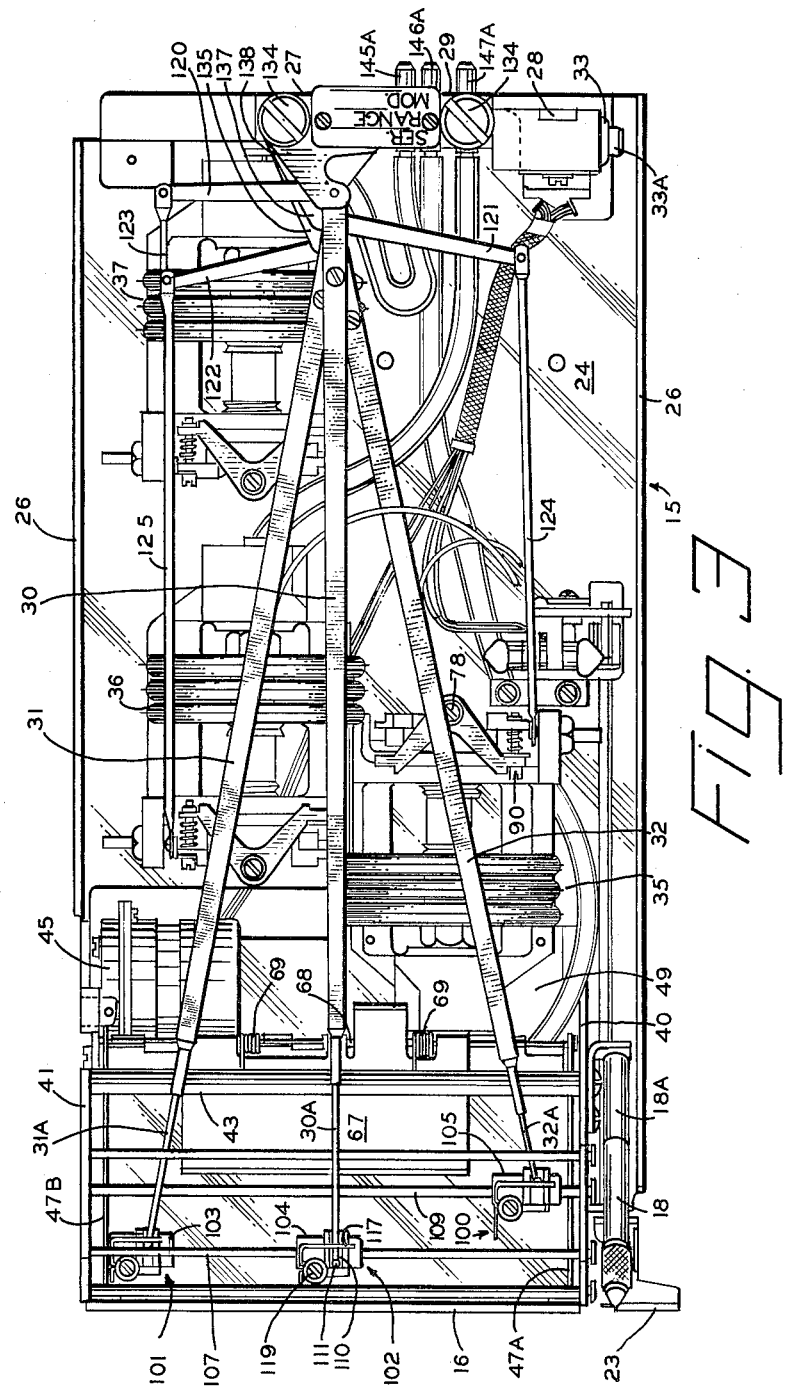

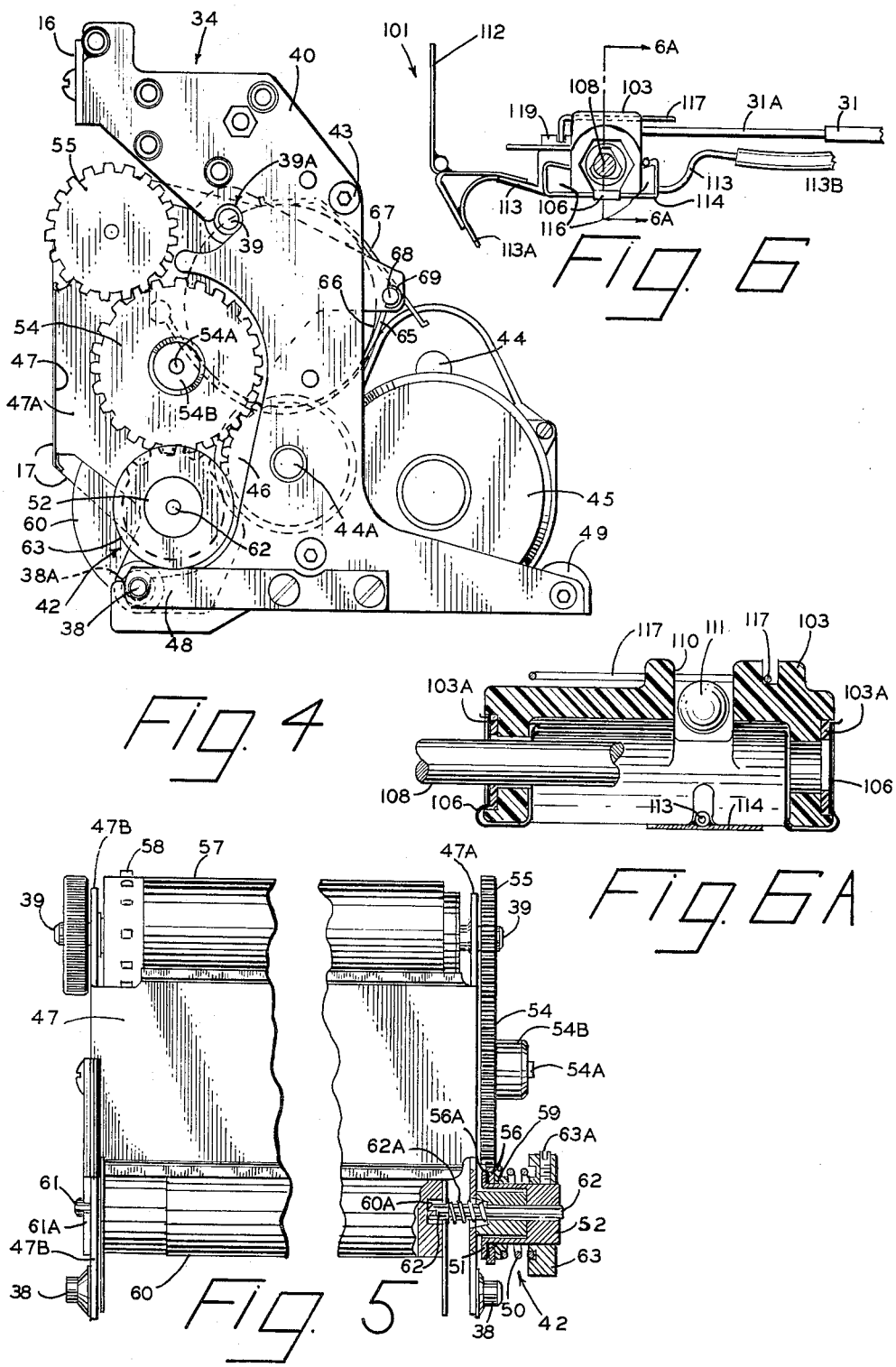

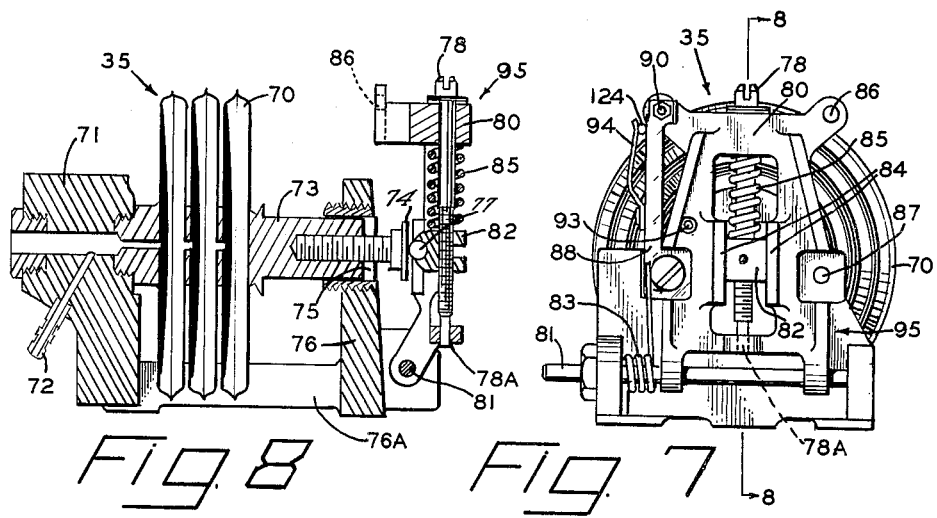
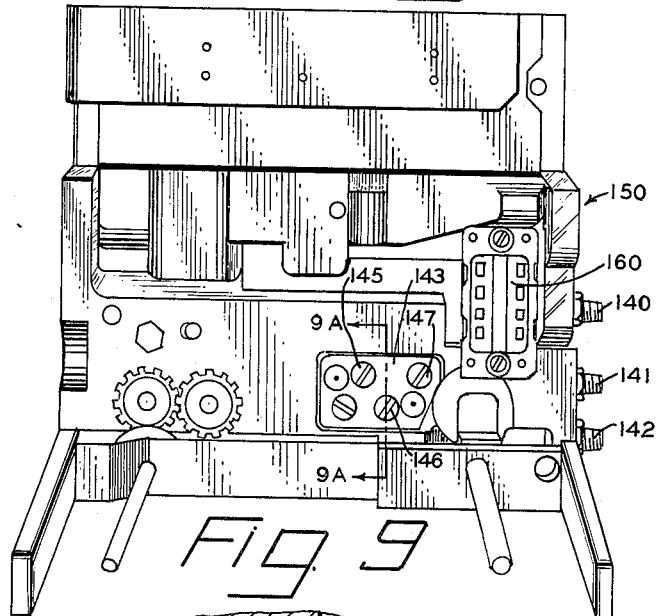
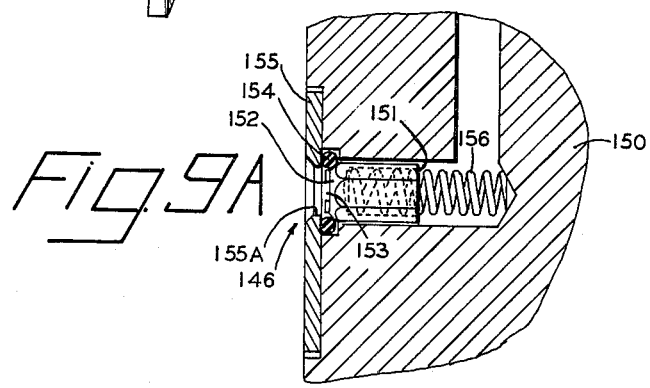

United States Patent Office 3,209,363
Patented Sept. 28, 1965

3,209,363
INDICATING APPARATUS
William C. Virbila, Oakville, Conn., assignor to The Bristol Company, Waterbury, Conn., a corporation of Connecticut
Filed Sept. 1, 1961, Ser. No. 135,471
12 Claims. (Cl. 346—17)

This invention relates to indicating instruments and more particularly to instruments for indicating and/or recording one or more variable conditions in a process cycle.

Indicating instruments of the type to which the present invention is directed, while of general application, are particularly advantageous when used as recorders of the strip-chart type which are arranged for removable and interchangeable installation in mounting spaces provided on a standardized panel structure. The instruments often are combined with controller apparatus to control as well as to provide an indication of a series of process variables. One such controller apparatus with which the indicating instrument of the present invention is particularly adaptable is disclosed in the copending patent application Serial No. 135,539 of William C. Virbila filed concurrently herewith.

The complexity of control functions in many modern industrial processes, as, for example, in chemical processing or oil refining, often has led to a large accumulation of instruments for providing an indication of the various process variables. Early attempts to centralize the instruments on panels in a common location or control room, usually at a point remote from the process apparatus itself, frequently necessitated the use of large and cumbersome panels which occupied a prohibitive amount of valuable space and were likely to prove confusing to the individuals monitoring the panels. Also, this centralization heretofore increased the cost and complexity of the instruments and the piping or wiring arrangements leading thereto, thus impairing the flexibility and interchangeability of the installation.

Such considerations have lead toward attempts at "miniaturization," involving a decrease in the size, and particularly in the panel area, of the instrument. However, since in many instances the interacting elements necessary for performing the indicating and/or recording functions cannot practicably be reduced below certain critical dimensions, and therefore the total amount of space taken up by a particular instrument cannot always be decreased beyond a certain point, a reduction in the panel area tends to increase the length of an instrument. Thus, the trend of design is toward a long and relatively slender instrument, having a substantially rectangular panel area and a depth of the order of, say, several times the width or height.

It will be apparent that little in the way of servicing or adjustment can be accomplished while an instrument of the foregoing proportions is in place on the mounting panel, and it is usually necessary to withdraw the instrument for even such routine matters as changing the ink supply or the chart. It will further be apparent that in most instances such withdrawal, and all work involved in securing the instrument in place or releasing it for removal, must be effected from the front. Otherwise, such work on one instrument might require removal of one or more adjacent units to permit the necessary access to the individual components.

It is, therefore, desirable to facilitate the removal of the instrument, or particular components thereof, with a minimum of manipulation or readjustment.

It is also desirable to provide for maximum flexibility and interchangeability in such instruments, to enable the installation of indicators, recorders or controllers (or instruments combining any or all of these functions) in centralized control groups without regard, within practical limits, for the distance between the control panel and the associated process apparatus. Such flexibility and interchangeability is enhanced by the use of telemetering systems to transmit information between the point of measurement or control in the process plant and the master control installation. In these systems, the primary measuring or control equipment is situated at or near the point at which the process function occur, and communication with distant supervisory indicating, recording and/or control equipment is carried on over electrical, fluid pressure or other telemetering channels.

It is thus desirable to provide simplified terminal translating equipment which is well adapted for use in miniaturized instruments of this class and which may be readily connected to the telemetering channels.

One general object of this invention, therefore, is to provide a new and improved instrument for indicating and/or recording one or more variable conditions in a process cycle.

More specifically, it is an object of this invention to provide an instrument of the character indicated which is of miniaturized design.

Another object of this invention is to provide such an instrument which is adapted for removable and interchangeable installation in a standard panel mounting and is otherwise adapted for simple and convenient maintenance.

Another object of the invention is to provide an instrument of the above nature in which either the entire instrument or particular components thereof may be withdrawn from the panel installation without the need for manipulating electrical or fluid pressure connections.

Still another object of the invention is to provide an efficient time chart drive mechanism for instruments of this class in which the timing function is effectively relieved of the chart driving function.

A further object of the invention is to provide a multiple indicating and recording instrument in which angular movements of the measuring components are converted into straight line motions for rectilinear indicating and recording.

Another object of the invention is to provide a transducer motor element for instruments of this class which is arranged to permit ready adjustment of the measured range and reference position for an incoming signal in a mutually non-interacting manner.

A further object of the invention is to provide a panel-mounted recording instrument having a novel inking system which is readily serviceable from its position within the instrument.

Still another object of the invention is to provide a recording instrument having a capillary ink feed which is substantially unaffected by the position of the instrument relative to a horizontal reference.

A still further object of the invention is to provide an indicating instrument utilizing comparatively simple mechanical components, which instrument is economical to manufacture and thoroughly reliable in operation.

Other objects as well as advantages of the present invention will be understood more clearly and fully from the following detailed description of a preferred embodiment thereof, when read in conjunction with the accompanying drawings, in which:

FIGURE 3 is a plan view of the chassis assembly of FIGURE 2;

FIGURE 4 is a side elevational view of the chart drive mechanism of the instrument;

FIGURE 5 is a fragmentary front view, partially in section, of a portion of the mechanism shown in FIGURE 4;

FIGURE 6 is a side elevational view of a pen and pointer carriage mechanism for the instrument;

FIGURE 6A is an enlarged sectional view taken along the line 6A—6A in FIGURE 6;

FIGURE 7 is a rear elevational view of one of the fluid pressure motor elements of the instrument, together with associated parts;

FIGURE 8 is a sectional view taken generally along the line 8—8 in FIGURE 7;

FIGURE 9 is a front perspective view of the rear interior face of the instrument housing; and FIGURE 9A is a fragmentary sectional view taken along the line 9A—9A in FIGURE 9.

Figure 1:
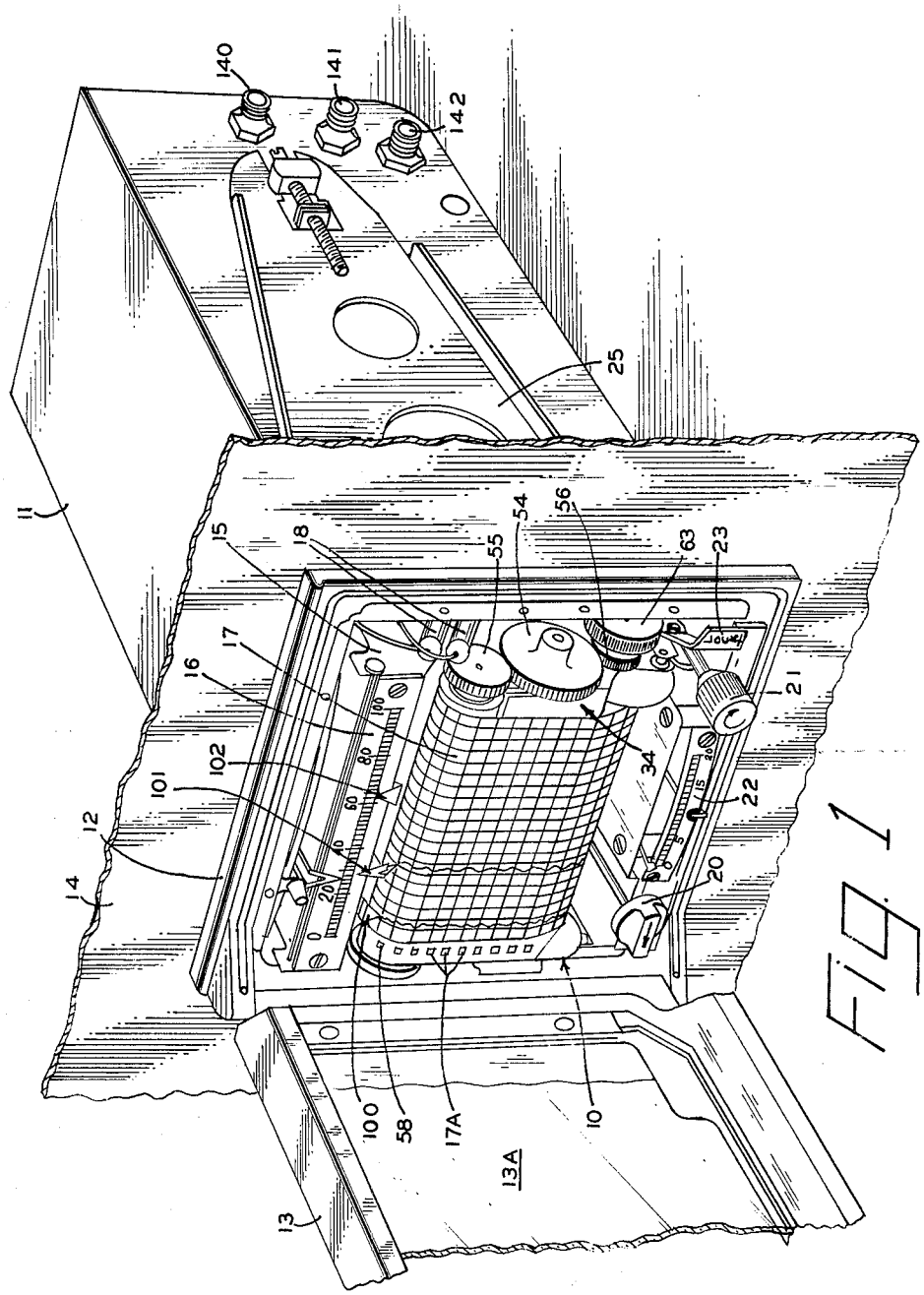
FIGURE 1 is a perspective view of an indicating and recording instrument constructed in accordance with a preferred embodiment of the invention.

Referring initially to FIGURE 1 of the drawings, there is shown a multiple-point indicating and recording instrument 10 which is arranged for removable mounting within a housing or case 11. Attached to the front of this case is a frame 12 to which is hinged a door 13 having a transparent panel 13A of glass, plastic or other suitable material. The case is supported in a mating aperture formed in a panel member 14 and is supported therefrom by cantilever bracket members 25 on either side of the case.

The instrument 10 includes a demountable chassis assembly, generally designated by the reference numeral 15, which is locked in place within the case 11 by a latch tab 23. The instrument also includes two control knobs 20 and 21 and an indicating gauge 22 adjacent the lower portion thereof. The knobs 20 and 21 and the gauge 22 are not essential to the present invention and will not be further discussed herein. They are, however, illustrated and described in detail in the copending patent application referred to above.

Figure 2:
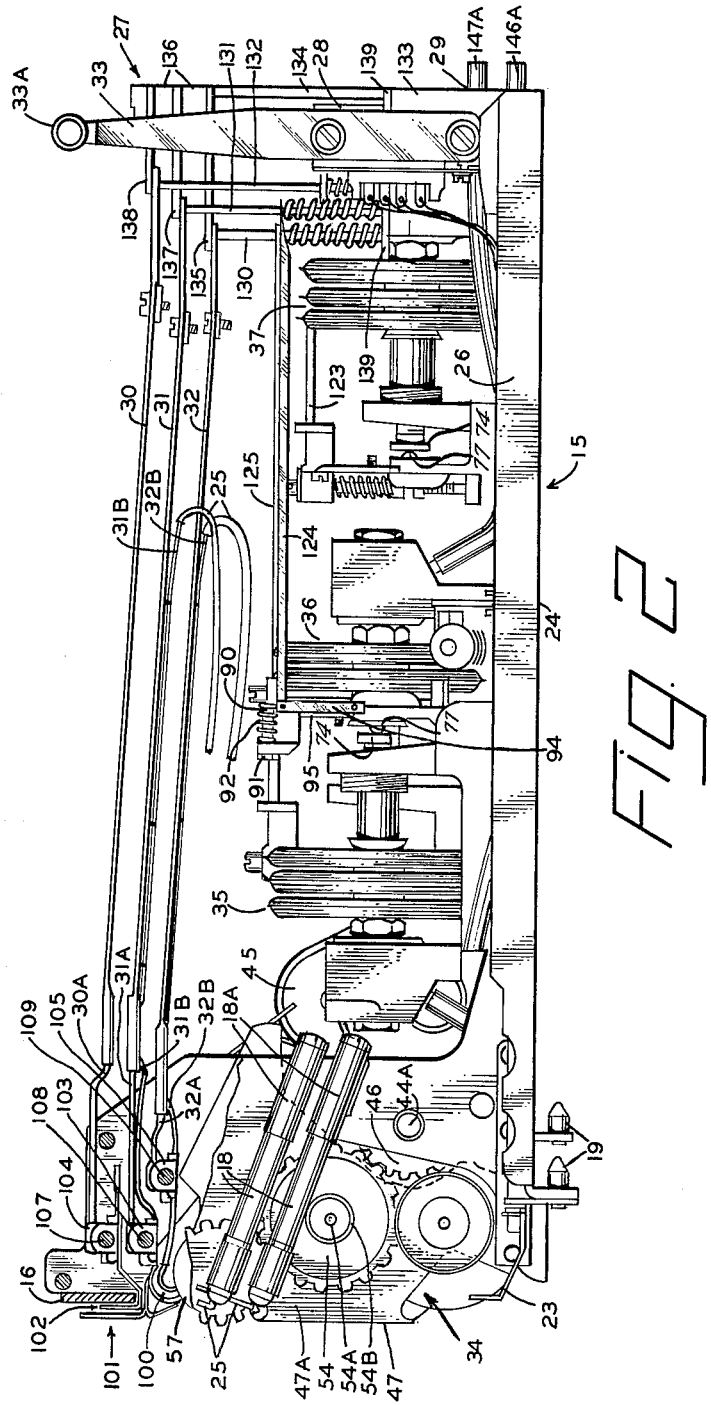
FIGURE 2 is a side elevational view, partially in section, of the demountable chassis assembly of the instrument.

As best shown in FIGURES 2 and 3, the component parts of the demountable chassis assembly 15 are supported on an elongated sheet metal base plate 24 whose longitudinal edges are formed into two side rails 26. In these figures, the assembly 15 is shown completely removed from the enclosing case 11.

At the left end of the plate 24, as viewed in FIGURE 2 (which may be called the "front end"), mounting pins 19 are carried on suitable right angle brackets extending below the chassis on either side thereof and are arranged to engage corresponding apertures in the case for centering and securing the assembly in rigid relationship therewith. Also mounted at this end of the base plate are the exhibiting members of the apparatus, including an indicator scale 16 (FIGURE 1) and a recording chart 17, and two ink reservoirs 18.

At the opposite end of the plate 24 (which may be designated the "rear end") is mounted a bearing member 27 which supports an electrical connecting socket 28, a plug-in fluid pressure connector block 29 and three elongated index arms 30, 31 and 32. These index arms are controlled by pneumatic motor elements 35, 36 and 37 (here shown, illustratively, as three) in a manner that will become more fully apparent hereafter. An upright post 33 having a roller 33A at its upper end is affixed adjacent the rear end of the plate to assist in guiding the chassis assembly 15 on insertion into the case 11 and to prevent the assembly from tipping forward when partially withdrawn.

Chart drive

The movement of the chart 17 is controlled by a chart drive mechanism indicated generally at 34. Fixed to the base plate 24, through a sub-base member 49 (FIGURE 3), are a pair of spaced end plates 40 and 41 which are supported at the top by the flat-surfaced indicating scale 16 and a support rod 43. A motor 45, an electrical motor of the synchronous type, is mounted on the sub-base member 49, at one side thereof. As best shown in FIGURE 4, this motor includes an output shaft 44 which is suitably geared to a drive shaft 44A whose ends are journaled in the end plates 40 and 41. At the driven end of the shaft 44A, there is mounted a drive gear 46.

All other elements of the drive mechanism 34 are mounted on a sub-frame 47 having integrally formed, folded-back side plates 47A and 47B (FIGURE 5). Meshing with the drive gear 46 is an intermediate driving gear 54 which is journaled on a stub shaft 54A fixed to the sub-frame at bearing 54B. Dependent gears 55 and 56 engage the driving gear 54 and are driven thereby in a common direction of rotation which is opposite to that of gear 54. The gear 55 is attached to the shaft of a drive roll 57 and through a toothed sprocket 58 thereon imparts timed motion to the perforated chart 17 (FIGURE 1) in a manner presently to be described. The gear 56 drives a removable take-up reel 60 on which is stored the accumulated portion of the recording chart. At one end of the removable take-up reel 60, a fixed axial pin 61 protrudes which engages a resilient clip 61A attached to the sub-frame portion 47B. The opposite end of the reel 60 is formed with a split recess 60A which engages a slotted axial pin 62 forming a shaft for the gear 56 and, by being thus keyed to the reel, causes it to turn with the gear.

The gear 56 is connected to the axial pin 62 through a friction clutch 42. This clutch includes a knurled knob 63 which is adjustably secured to an intermediate collar 52, as by set screws 63A. The collar 52 is fixed permanently to the pin 62 and has an extended cylindrical portion terminating in a flange member 51. Gear 56 is journaled on this extended portion and makes frictional engagement on one side with the member 51 through an interposed friction surface 56A attached to the juxtaposed face of the gear. The surface 56A illustratively may be of cork or similar material. A compression spring 50 surrounds the collar 52 and exerts an adjustable force between the knob 63 and the face of the gear opposite the face in frictional engagement with flange 51. Between the spring and the adjacent gear face is an anti-friction collar 59 of nylon or like material which minimizes friction effects on this side of gear 56. With this arrangement, the force of engagement between the gear 56 and the pin 62 is determined by the compression of spring 50. The spring compression is adjustable by adjusting the position of the knurled knob 63 on the collar 52 through the set screws 63. A further compression spring 62A surrounds the pin 62 and exerts an axial force to maintain the pin in engagement with the reel 60. The pin may be retracted from the split recess 60A in the reel by manually pulling the knurled wheel outwardly against the force of the spring 62A, thus permitting removal and replacement of the reel.

Attached to the sub-frame 47 between the rearwardly extending side plates 47A and 47B is a trough-like receptacle or holder 65 (FIGURE 4). This receptacle accommodates a roll of unused chart, such as that designated by the numeral 66. A clip member 67 is pivoted about a support rod 68 mounted between the plates 47A and 47B, and a pair of torsion springs 69 in engagement with the clip cause it to exert a restraining frictional force on the chart roll by contact along its length. The chart is fed from this roll over the drive roll 57 (FIGURE 5), spaced perforations near one edge of the chart engaging the teeth of the driving sprocket 58. Thence, the chart travels across the front face of the sub-frame 47 and onto the storage, or take-up, reel 60.

The chart drive roll 57 is driven by the motor 45 and connecting gears at a constant speed, so that markings of the pen system, yet to be described, will be inscribed on the moving chart with reference to time along the length of the chart. The linear speed of the chart is determined by the constant speed feed sprocket 58 whose teeth are in positive engagement with the chart perforations. In certain particularly advantageous embodiments, the two gears 55 and 56 driven by gear 54 are chosen such that the take-up reel 60 runs somewhat faster and, as already noted, in the same direction of rotation with respect to the drive roll 57. Hence, when there is a chart being wound on the take-up reel, this reel is forced by the chart itself to conform to the speed of the chart drive roll, any discrepancy or difference in speed being taken up through slippage of the interposed friction clutch 42. For a given relative speed between the gears 55 and 56, it is apparent that, considering the linear speed of the used chart being rolled up on the take-up reel, the amount of this slippage is directly related to the diameter of the spent chart roll at any given time. At the supply end of the chart, the unused portion of the roll is held in restraint, as described, by the spring clip 67. It will be noted that the action of the spring in this case is to apply a force against the unused chart roll which varies directly with the roll diameter, and the restraining force acting in the direction of the chart length similarly varies with the diameter of the roll. Thus, when the chart roll is new and of maximum diameter, there is developed a maximum torque by the action of the restraining clip on the roll. The torque varies from this maximum value to a minimum as the chart is exhausted from the supply roll. Correspondingly, at the spent chart roll a torque is developed by the over-travel of the take-up reel which is at a maximum when the spent chart is first applied to the reel. This torque decreases as the spent roll increases in diameter. The arrangement is such that, by adjusting the clutch 42 to vary its rate of slippage and thereby establish a torque acting on the take-up reel which corresponds with that acting on the supply roll, the tension on the chart is approxiatemly balanced, and the feed sprocket 58 is substantially relieved of the function of moving the chart and performs a predominantly speed regulating function for the chart. As a result, any interacting forces between the chart perforations and the driving sprocket teeth are minimized, the chart being maintained in substantially constant tension without deformation or tearing at the perforations.

Mounted adjacent the upper edge of each of the side plates 47A and 47B of the sub-frame 47 is an outwardly projecting lug 39. As best shown in FIGURE 4, these lugs cooperate with corresponding slotted recesses 39A in the fixed plates 40 and 41. Similarly, near each of the lower forward corners of the sub-frame 47 there is mounted an outwardly projecting lug 38 which normally is retained in a slotted recess 38A correspondingly situated in the adjacent fixed plate. A flat spring member 48 is fastened at one end to the fixed plate 40 and is provided with a hole at its opposite end which is snapped over the corresponding lug 38 to lock the sub-frame 47 in place. By disengaging the spring member 48 and the associated lug 38, the chart subassembly may be removed for convenient reloading of the chart, etc. On replacement, the subassembly is readily slid into place, where it is retained by the slotted recesses 38A and 39A and is locked by the spring member 48. During the removal and replacement of the subassembly, the main gear 54 readily slides out of and into mesh with the drive gear 46.

Motor elements

The three transducer motor elements 35, 36 and 37 (FIGURES 2 and 3) serve to convert an input signal into corresponding movements of the indicator and pen arms. In the illustrated embodiment of the invention, these elements comprise capsular pressure bellows which are responsive to fluid pressures. As will become more fully apparent hereafter, in response to signal pressure the elements 35, 36 and 37 respectively control the linear movement of three links 124, 125 and 123 which operate corresponding crank arms 121, 122 and 120 attached to individual shaft members 131, 130 and 132, respectively. These shaft members in turn control the operation of the index arms 31, 32 and 30.

A typical motor element, such as the motor element 35, is shown in detail in detail in FIGURES 7 and 8. The element 35 includes a pressure capsule 70 which is supported at one end by screwing it into a mounting block 71 affixed to the base plate 24 (FIGURE 2). The block 71 is suitably drilled to provide fluid passage to an external conduit connection 72 carrying input signals. To the free end of the capsule 70 is attached an axial take-off plug 73 into which extends a tapped hole which accommodates an adjustable take-off pad 74. The plug 73 is cylindrical in shape and fits into a fixed guide tube 75 supported on an upstanding pillar 76 which forms a part of the mounting block 71 and is connected thereto by a rib 76A.

The linear translatory motion of the motor element 35 is transferred to the corresponding linkage arm in the pen-indicator system, to be described hereinafter, by means of a follower member 95. The member 95 includes an upstanding frame 80 fixed to a horizontal shaft 81 which is pivotally carried by a portion of the mounting block 71. Mounted between two upstanding guides 84 on the frame 80 is a vertically-adjustable slider member 82. Installed in a recess in this slider in juxtaposition with the take-off pad 74 is a ball 77 which normally is retained in contact with the pad. Thus, a torsion spring 83 surrounds the shaft 81 and urges the follower member 95 in a counterclockwise direction, as viewed in FIGURE 8, to maintain the ball 77 and the pad 74 in physical contact. The slider member 82 is threaded through a vertical adjusting screw 78 which extends from a clearance hole in the top of the follower member to a socket 78A adjacent the lower portion thereof. A compression spring 85 surrounds the screw 78 and serves to take up backlash.

The upper portion of the follower frame 80 is extended horizontally and is provided with a pair of mounting holes 86 on opposite sides of the frame. Another pair of mounting holes, as 87, are provided near the middle of the frame. The holes 86 and 87 provide for adjustable connection to the motion transmitting linkage system, to be later described, and are used in generally vertical pairs, 86 and 87, the particular pair to be used depending on the location of the measuring element on the chassis. A bracket member 88 is mounted from the lower mounting hole 87 of the pair in use. This bracket member is in the form of a cantilever spring which extends in a substantially vertical direction with its upper end in juxtaposition with the corresponding upper mounting hole. The upper mounting holes 86 are offset in a longitudinal direction with respect to the lower mounting holes 87. There is a clearance hole adjacent the upper end of the bracket 88 which accommodates a horizontally extending screw 90 mounted in the corresponding hole 86. A hexnut 91 (FIGURE 2) is placed over the end of the screw 90, and a compression spring 92 holds the bracket 88 and the follower member 95 apart by an adjustable amount determined by the position of the screw. A side portion of the bracket is bent back at right angles, and riveted to this side portion is a spring clip 94 which engages the adjacent end of the linkage member 124. An adjustable screw 93 is threaded through a hole in the follower frame 80 adjacent the bracket 88 and engages the mounting pillar 76 to establish a predetermined reference position for the follower member 95. Thus, for example, if the instrument is used as the receiver in a pneumatic pressure telemetering system, the screw 93 is adjusted to stop the follower member 95 at a datum pressure equivalent to instrument zero as registered on the exhibiting members.

Adjustment of the horizontally extending screw 90 has the effect of shifting the longitudinal position of the connecting arm 124, thus shifting the positions of the linkage member controlled thereby and, ultimately, the terminal pen or indicator pointer. This motion may be referred to as "zero shift." Adjustment of the upstanding screw 78 serves to shift the point of contact of the ball 77 with the linearly movable pad 74, to thereby vary the range, or "span" of movement, of the follower member 95 for a given motor element. In operation, the position of the pad 74 is initially adjusted so that, with the pressure input at the connection 72 at the mid-point of its range, the pad holds the follower member 95 vertical, that is, so that a vertical line through the axis of the pivot shaft 81 intersects this axis at right angles and passes through the point of contact of ball and pad. In addition, the adjusting screw 90 is positioned so that the terminal pen and/or indicator pointer is at the mid-point of its associated chart or scale, thus establishing a reference position. Finally, the position of the ball is adjusted by screw 78 so that, for the desired range or span of input, the pen and/or pointer wlil move over a corresponding range. Thus, the screw 78 is adjusted to vary the amount of movement of the pen and/or pointer for a given input until this movement corresponds with the desired scale. It is to be observed that the adjustments of the screws 78 and 90 are independent, or non-interacting, with the result that, for a given installation, either the range or the zero shift motion may be accurately adjusted without affecting the other.

*Indicator system*

In the illustrated embodiment of the invention, there are provided three indicating elements 100, 101 and 102 (FIGURE 1) which are arranged to handle the simultaneous registration of three variables. The element 100 comprises a recording pen which serves to record its variable on the moving chart 17, while the element 101 comprises both a recording pen and an indicator pointer, the latter cooperating with the calibrated scale 16. The element 102 comprises a pointer only which also co-operates with the scale 16.

As best shown in FIGURES 2 and 3, the elements 100, 101 and 102 are borne by carriage members 105, 103 and 104, respectively, which are adapted to slide on respective guide rods 109, 108 and 107. These guide rods extend in spaced-apart relationship with one another in directions parallel to each other, to the indicator scale 16 and to the axis of the recording chart 17.

A typical carriage member, such as the member 103, is best shown in FIGURES 6 and 6A. The member 103 is in the form of a substantially hollow body of plastic material, such as Delrin, with openings in opposite ends to accommodate the guide rod 108. Concentric with these openings are external hexagonal recesses into which are fitted replaceable bearing plates 103A. These plates are preferably of an anti-friction material, such as Teflon, and are each formed with a hole of triangular shape in co-operation with which the guide rod 108 slides with minimum friction. U-shaped spring clips 106, hexagonal on one side and bifurcated on the other, fit over the body wall and hold in place the bearing plates 103A. On the upper side of the member 103 is formed a straight-sided slot 110 which extends in a direction perpendicular to that of the guide rod 108. This slot receives a ball-shaped terminal end 111 on a solid rod portion 31A of the corresponding index arm 31. A wire 117 is attached to the member 103 by a screw 119 and extends over the portion 31A to prevent inadvertent lifting of the ball-end out of the guide slot 110.

The lower portion of the carriage member 103 is formed with two horizontally extending projections or ears 116 which engage the bent-over ends of a thin spring bracket member 114. This bracket member demountably supports an ink-transmitting capillary tube 113, the outer end of which forms a pen tip 113A for marking on the recording chart 17. The tip 113A is of a length and shape sufficient to make contact with the chart at a predetermined point and is disposed in a manner such that it will not interfere with the motions of other recording pens simultaneously using the same chart. An indicator tab 112 is soldered adjacent the pen tip and illustratively may be painted a distinctive color for easy visual identification.

To the inner end of the pen tube 113 is attached a fine-bore plastic tube 113B which connects with metal tubing forming part of the index arm 31, as will become more fully apparent hereafter.

In the three-point indicator-recorder system illustrated, the three index arms 30, 31 and 32 (FIGURES 2 and 3) are disposed along the long dimension of the chassis and are respectively attached to shafts 132, 131 and 130. The centers of rotation of these shafts are in close proximity but do not form a common axis of rotation. The bearing support 27 for the shafts 130, 131 and 132 comprises a base 133, two upstanding pillar members 134, a lower bearing plate 139 drilled with three spaced bearing holes for the respective shafts and three upper bearing plates 135, 137 and 138 vertically separated by spacers 136. The index arms 30, 31 and 32 are affixed to the upper ends of the corresponding shafts 132, 131 and 130, and three crank arms 120, 121 and 122 are respectively secured to the shafts adjacent the lower portions thereof. These crank arms extend outwardly from their respective shafts and are pivotably joined to the link members 123, 124 and 125, respectively. As indicated heretofore, these links transmit motion from the corresponding motor elements 37, 35 and 36.

The index arms 30, 31 and 32 are formed of light, flattened metal construction with the edges rolled over for added stiffness. At the terminal ends of the arms, each arm is formed to embrace one of the solid rod portions 30A, 31A and 32A which terminates in the ball for the corresponding pen carriage member, as hereinbefore described. The arms 31 and 32 are provided with fine capillary metal tubes 31B and 32B, respectively, which are suitably attached, as by soldering, to the underside of the corresponding arm throughout much of its length. Near the right hand end of each arm, as viewed in FIGURE 2, the metal tube is formed to accommodate a flexible plastic tube 25 leading to one of the ink reservoirs 18. These reservoirs are of short plastic tubing construction and fit into socket members 18A attached to the chassis assembly 15 adjacent the chart drive mechanism 34. The opposite ends of the metal tubes on the arms 31 and 32 are connected by flexible plastic tubing, such as the tubing 113B (FIGURE 6), to the capillary tubes leading to the pen tips in the indicating elements 100 and 101.

*Demountable connections*

As best shown in FIGURE 9, the rear portion of the housing 11 is provided with a mounting block 150. This block is in the form of a solid casting in which internally drilled holes lead from each of three external connectors 140, 141 and 142 to corresponding self-sealing ports 145, 146 and 147 of a three-port plug valve assembly 143. The connectors 140, 141 and 142 comprise fluid pressure connections leading to conduits (not shown) which are arranged to transmit pressures from distant sources representative of various variables to be indicated and/or recorded. The self-sealing ports 145, 146 and 147 are maintained in fluid-tight but removable relationship with respective hollow male terminal members 145A, 146A and 147A (FIGURE 3) which are mounted on the connector block 29 carried by the chassis assembly 15. These terminal members are each suitably connected to one of the motor elements 35, 36 and 37.

A typical self-sealing pressure port, such as the port 146, is best shown in FIGURE 9A. The port comprises a hole drilled in the mounting block 150 into which is loosely fitted a hollow hexagonal plug member 151. The outer portion of this plug is closed and is formed with a chamfer 152, and the outer plug face is grooved as indicated at 153. Occupying a counter-bored recess in the block 150 is a circular resilient grommet or gasket 154 against which rests the chamfered face 152 of the plug member. A face plate 155 is screwed to the adjacent portion of the block and is provided with an access hole 155A which accommodates the male plug member 146A (FIGURE 3) of fixture 29. The plate 155 serves to retain the internal parts of the port 146 in position against the pressure of a compression spring 156 disposed within the plug member 151 and against any internal fluid pressure. Insertion of the male plug 146 A in the port 146 displaces the member 151 and permits access to the pressure fluid. The gasket 154 surrounds the inserted plug and prevents leakage.

To operate the chart drive motor 45, and in other cases in which electricity is to be supplied to the instrument, the mounting block 150 is provided with an external multipoint male plug 160. This plug is arranged to automatically engage the socket 28 (FIGURE 3) on the chassis assembly 15 upon the insertion of the chassis in the housing 11.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. In a panel-mounted, strip-chart recording instrument for recording values of a variable condition, in combination, a chassis assembly, support means for releasably securing said chassis assembly to a panel member, to enable the withdrawal of said chassis assembly from said member, transducer means carried by said chassis assembly and including a tranducer element movable in response to changes in said variable condition, exhibiting means including a linearly movable chart visible from said panel member for indicating values of said condition, means mounted on said chassis assembly for connecting said transducer means and said exhibiting means in energy transfer relation, roller means including a supply roll and a take-up roll for supporting said chart, a motor fixedly secured to said chassis assembly, driving means controlled by said motor for rotating said take-up roll, a sub-assembly for maintaining said chart, said supply roll, said take-up roll and said driving means in predetermined relationship with one another, mounting means for maintaining said sub-assembly in rigid but detachable relationship with said chassis assembly, to permit withdrawal of said chart, said supply roll, said take-up roll and said driving means as a unit from said chassis assembly to a position outside said panel member, a plurality of independently adjustable calibration means interposed between said transducer element and said exhibiting means, one of said calibration means being effective to establish a reference position for said exhibiting means and the other of said calibration means being effective to vary the span of movement of said exhibiting means for a given range of said variable condition, and adjustment means for varying the position of said transducer element for a selected input thereto, to enable the calibration of said span of movement without affecting the location of said reference position.

2. An apparatus of the character set forth in claim 1, in which said roller means includes a drive roll intermediate said supply roll and said take-up roll, said drive roll being controlled by said driving means to advance said chart at a substantially uniform speed and being mounted on said sub-assembly to permit withdrawal therewith.

3. An apparatus of the character set forth in claim 1, in which said support means includes separable coupling means having a first portion in fixed relationship with said panel member and having a second portion mounted on said chassis assembly said first portion including a pressure port in communication with said transducer means, and spring means for automatically sealing said pressure port upon the withdrawal of said chassis assembly from said panel member.

4. In a panel-mounted instrument for indicating values of a variable condition, in combination, a chassis assembly, means for releasably securing said chassis assembly to said panel, transducer means mounted on said chassis assembly and responsive to said variable condition, exhibiting means for indicating values of said condition, said exhibiting means including a linearly movable chart, a carriage member movable transversely with respect to the direction of movement thereof and an elongated guide element for directing said member along a straight path, linkage means carried by said assembly and including an angularly movable index arm controlled by said transducer means, means for slidably connecting one end of said index arm to said carriage member, to convert the angular motions of said arm into corresponding straight motions of said member along said path, driving means for controlling the movement of said chart, a sub-assembly for supporting said driving means and said chart, means for maintaining said sub-assembly in rigid but detachable relationship with said chassis assembly, to permit withdrawal of said driving means and said chart as a unit from said chassis assembly to a position outside said panel, separable coupling means having a first portion in fixed relationship with said panel and a second portion carried by said chassis assembly, said first portion including a pressure port in communication with said transducer means, and means including a coil spring disposed within said pressure port for automatically sealing the same upon the withdrawal of said chassis assembly from said panel.

5. In a panel-mounted instrument for indicating values of a variable condition, in combination, a chassis assembly, means for maintaining said chassis assembly in rigid but detachable relationship with said panel, to permit access to said chassis assembly from outside said panel, fluid-pressure means carried by said chassis assembly and including a first reciprocable element linearly movable in response to changes in said variable condition, pivot means in point contact with said first element for converting the linear movements thereof into corresponding angular movements, adjustment means for varying the position of said first element for a selected input to said fluid-pressure means until the point of contact of said first element with said pivot means is located along a straight line through the pivotal axis thereof which intersects the direction of movement of said first element at a right angle, exhibiting means mounted on said chassis assembly for indicating values of said variable condition, said exhibiting means including a substantially flat scale and a second reciprocable element linearly movable along said scale, and linkage means interconnecting said pivot means and said second reciprocable element and having an index arm in slidable contact therewith for converting the angular movements of said pivot means into corresponding linear movements of said second element along said scale, first calibration means for adjusting said linkage means to establish a reference position on said scale for the movement of said second reciprocable element, and second calibration means for adjusting said linkage means to vary the amount of movement of said second element along said scale for a given change in said variable condition, each of said calibration means being independently adjustable without affecting the adjustment of the other calibration means.

6. In a panel-mounted instrument for indicating values of a variable condition, in combination, a chassis assembly, means for maintaining said chassis assembly in rigid but detachable relationship with said panel, to permit access to said chassis assembly from outside said panel, fluid-pressure mean carried by said chassis assembly and including a first reciprocable element linearly movable in response to changes in said variable condition, pivot means in point contact with said first element for converting the linear movements thereof into corresponding angular movements, adjustment means for varying the position of said first element for a selected input to said fluid-pressure means until the point of contact of said first element with said pivot means is located along a straight line through the pivotal axis thereof which intersects the direction of movement of said first element at a right angle, exhibiting means mounted on said chassis assembly for indicating values of said variable condition, said exhibiting means including a substantially flat scale and a second reciprocable element linearly movable along said scale, linkage means interconnecting said pivot means and said second reciprocable element for converting the angular movements of said pivot means into corresponding linear movements of said second element along said scale, said linkage means including an index arm in slidable contact with said second element and an elongated arm member connected to said pivot means, and means for adjusting the effective length of said arm member, to thereby establish a reference position for the movement of said second reciprocable element along said scale.

7. In a panel-mounted instrument for indicating values of a variable condition, in combination, a chassis assembly, means for releasably securing said chassis assembly to said panel, transducer means carried by said chassis assembly and including a first element linearly movable in response to changes in said variable condition, pivot means in point contact with said first element for converting the linear movements thereof into corresponding angular movements, adjustment means for varying the position of said first element for a selected input to said transducer means until the point of contact of said first element with said pivot means is located along a straight line through the pivotal axis thereof which intersects the direction of movement of said first element at a right angle, exhibiting means mounted on said chassis assembly and including a second element for indicating values of said variable condition, linkage means interconnecting said pivot means and said second element for converting the angular movements of said pivot means into proportional linear movements of said second element, said linkage means including an index arm in slidable contact with said second element and an elongated arm member connected to said pivot means, first calibration means for varying the position of said arm member relative to said pivot means, to vary the effective length of said arm member and thereby establish a reference position for the movement of said second element, and second calibration means for varying the point of contact between said first element and said pivot means, to thereby vary the amount of the connected second element for a given change in said variable condition.

8. An instrument of the character set forth in claim 7, in which said first and second calibration means are independently variable in non-interacting relationship with each other.

9. In a panel-mounted, multi-point recording instrument for recording values of a plurality of variable conditions on a continuously movable common record medium, in combination, a chassis assembly, mounting means for releasably securing said chassis assembly to a supporting panel, to enable withdrawal of said chassis assembly therefrom, first transducer means supported on said chassis assembly and responsive to a first variable condition, second transducer means supported on said chassis assembly and responsive to a second variable condition, means carried by said chassis assembly and including independently movable first and second exhibiting elements for independently recording values of said first and second variable conditions on said common record medium, linkage means for respectively connecting said exhibiting elements to said first and second transducer means, first calibration means for adjusting said first transducer means, to calibrate the movements of said first exhibiting element on said record medium in accordance with said first condition, second calibration means operable independently of said first calibration means for adjusting said second transducer means, to independently calibrate the movements of said second exhibiting element on said record medium in accordance with said second condition, an electric motor fixedly secured to said chassis assembly, driving means controlled by said motor for advancing said record medium at a uniform speed, a sub-assembly for supporting said driving means and said record medium, means for releasably securing said sub-assembly to said chassis assembly, to permit withdrawal of said driving means and said record medium as a unit from said chassis assembly to a position outside said panel, separable coupling means having a first portion in fixed relationship with said panel and a second portion carried by said chassis assembly, said first portion including a plurality of pressure ports respectively connected to said first and second transducer means, and means including a coil spring disposed within each of said pressure ports for automatically sealing the same upon the withdrawal of said chassis assembly from said panel.

10. An instrument of the character set forth in claim 9, in which each of said exhibiting elements comprises a recording pen, and means releasably mounted on said chassis assembly immediately adjacent said supporting panel for supplying ink to each said pen.

11. In a panel-mounted instrument for indicating values of a variable condition on a linearly movable chart, in combination, a chassis assembly, means for maintaining said chassis assembly in rigid but detachable relationship with a supporting panel, to permit access to said chassis assembly from the front of said panel, transducer means carried by said chassis assembly and responsive to said variable condition, exhibiting means cooperating with said chart for indicating values of said condition, said exhibiting means including a carriage member linearly movable in a direction transverse to the direction of movement of said chart and a guide rod for directing said carriage member along a straight path, linkage means having an elongated arm member controlled by said transducer means and an angularly movable index arm operable in response to said arm member, connecting means for maintaining said index arm in sliding relationship with said carriage member to convert the angular motions of said arm into corresponding straight motions of said carriage member along said path, a sub-assembly carried by said detachable chassis assembly and including a supply roll, a take-up roll and a drive roll for supporting said chart, driving means for rotating said drive roll to advance said chart, means operatively associated with said take-up roll for applying continuously decreasing tension forces to said chart in one direction, means operatively associated with said supply roll for applying continuously decreasing tensions forces to said chart in the opposite direction, means for balancing said tension forces, to maintain said chart under constant tension at all times during the advance thereof by said driving means, and mounting means for maintaining said sub-assembly in rigid but detachable relationship with said detachable chassis assembly, to permit withdrawal of said chart, said supply roll, said take-up roll and said drive roll as a unit from said chassis assembly to a position in front of said panel member.

12. In a panel-mounted instrument for recording values of a variable condition on a linearly movable chart, in combination, a chassis assembly, means for maintaining said chassis assembly in rigid but detachable relationship with a supporting panel, to permit access to said chassis assembly from the front of said panel, transducer means carried by said chassis assembly and responsive to said variable condition, said transducer means including a pivot member angularly movable in accordance with said condition, linkage means having an elongated arm member movable in a longitudinal direction in response to said pivot means and an angularly movable index arm operable in response to said arm member, inking means cooperating with said chart for recording values of said condition thereon, said inking means including a carriage member linearly movable in a direction parallel to said chart, a guide rod for directing said carriage member along a straight path, a recording pen supported by said carriage member and means releasably mounted on said chassis assembly immediately adjacent said panel for supplying ink to said pen, connecting means for maintaining said index arm in sliding relationship with said carriage member to convert the angular motion of said arm into corresponding straight motions of said carriage member, first calibration means for adjusting the effective length of said arm member to establish a reference position for the movement of said carriage member, second calibration means for adjusting said connecting means to vary the amount of movement of said carriage member for a given change in said variable condition, each of said calibration means being independently adjustable without affecting the adjustment of the other calibration means, a sub-assembly carried by said detachable chassis assembly and including a supply roll, a take-up roll and a drive roll for supporting said chart, driving means for rotating said drive roll to advance said chart, clutch means operatively associated with said take-up roll for applying continuously decreasing tension forces to said chart in one direction, spring means for resisting rotation of the portion of said chart on said supply roll to apply continuously decreasing tension forces to said chart in the opposite direction, means for balancing said tension forces, to maintain said chart under constant tension at all times during the advance thereof by said driving means, and mounting means for maintaining said sub-assembly in rigid but detachable relationship with said detachable chassis assembly, to permit withdrawal of said chart, said supply roll, said take-up roll and said drive roll as a unit from said chassis assembly to a position in front of said panel member.

References Cited by the Examiner

UNITED STATES PATENTS

| | | | |
|---|---|---|---|
| 2,594,136 | 4/52 | DiMaggio | 346—139 X |
| 2,620,666 | 12/52 | Schmidt | 73—404 |
| 2,663,609 | 12/53 | Jones | 346—24 |
| 2,710,191 | 6/55 | Williams | 346—138 X |
| 2,714,010 | 7/55 | Gruber et al. | 346—138 X |
| 2,852,197 | 9/58 | Virbila | 346—145 X |
| 2,860,250 | 11/58 | Pouppirt | 346—49 X |
| 2,903,323 | 9/59 | Riester et al. | 346—136 |
| 2,937,820 | 5/60 | Wilson | 242—75.43 |
| 2,942,927 | 6/60 | Keyser | 346—17 |
| 2,988,293 | 6/61 | Gross | 242—55.11 |
| 3,044,069 | 7/62 | Klumb et al. | 346—145 X |
| 3,048,848 | 6/62 | May | 346—78 |
| 3,051,408 | 8/62 | Finch | 242—75.4 |
| 3,082,970 | 3/63 | Rasmussen | 242—55.53 |

FOREIGN PATENTS 633,527 8/36 Germany.

LEO SMILOW, *Primary Examiner.*

WILLIAM MISIEK, *Examiner.*